United States Patent [19]
Youngs-McVicker

[11] Patent Number: 5,323,733
[45] Date of Patent: Jun. 28, 1994

[54] BIRD FEEDER HAVING A PARTITION THEREIN FOR REDUCING FEED SCATTERING BY BIRDS

[76] Inventor: Janene Youngs-McVicker, 900 E. Clark Trail, Herrin, Ill. 62948

[21] Appl. No.: 47,858

[22] Filed: Apr. 15, 1993

Related U.S. Application Data

[63] Continuation-in-part of Ser. No. 923,313, Jul. 31, 1992, abandoned.

[51] Int. Cl.⁵ .......................................... A01K 39/014
[52] U.S. Cl. ........................................ 119/18; 119/61; 119/63
[58] Field of Search ............... 119/18, 61, 63, 52.4, 119/73, 51.5

[56] References Cited

U.S. PATENT DOCUMENTS

| D. 251,688 | 4/1979 | Kimbrough, III . | |
|---|---|---|---|
| D. 280,559 | 9/1985 | Bentall . | |
| 679,285 | 7/1901 | Allen | 119/51.5 |
| 705,896 | 7/1902 | Barnes | 119/63 |
| 725,162 | 4/1903 | Smith | 119/63 |
| 907,227 | 12/1908 | Eaton | 119/63 |
| 1,234,117 | 7/1917 | Barnes . | |
| 1,251,374 | 12/1917 | Hosch . | |
| 2,316,463 | 4/1943 | Skulina . | |
| 2,475,207 | 7/1949 | Smith . | |
| 2,968,281 | 1/1961 | McCauley . | |
| 2,972,979 | 2/1961 | Struck | 119/51.5 |
| 3,066,648 | 12/1962 | Kohlhauf | 119/18 |
| 3,114,350 | 12/1963 | King et al. . | |
| 3,951,107 | 4/1976 | Doty . | |
| 4,357,905 | 11/1982 | Carpenter | 119/51.5 |
| 4,505,227 | 3/1985 | Hartke et al. | 119/63 |
| 4,838,205 | 6/1989 | Larson . | |
| 4,974,546 | 12/1990 | Burgett | 119/18 |

FOREIGN PATENT DOCUMENTS

| 32327 | 2/1912 | Sweden | 119/63 |
|---|---|---|---|
| 196376 | 1/1922 | United Kingdom . | |
| 355863 | 9/1931 | United Kingdom | 119/18 |
| 755106 | 8/1954 | United Kingdom | 119/18 |

Primary Examiner—Gene Mancene
Assistant Examiner—Todd E. Manahan
Attorney, Agent, or Firm—Barnes & Thornburg

[57] ABSTRACT

A bird feeder is provided for use in a bird cage. The feeder includes a cup having a bottom surface and an outer wall. The outer wall includes a top edge defining an inner region for holding bird feed therein. The feeder also includes a partition or other suitable structure coupled to the outer wall of the cup for blocking lateral movement of a bird's beak within the inner region of the cup, thereby reducing the amount of bird feed that is thrown out of the cup by the bird.

19 Claims, 2 Drawing Sheets

BIRD FEEDER HAVING A PARTITION THEREIN FOR REDUCING FEED SCATTERING BY BIRDS

BACKGROUND AND SUMMARY OF THE INVENTION

This application is a continuation-in-part of copending application Ser. No. 07/923,313 filed Jul. 31, 1992, now abandoned.

The present invention relates to a bird feeder for use inside a bird cage. More particularly, the present invention relates to a bird feeder which reduces the amount of bird feed thrown from the cage by the bird during feeding.

One problem with keeping live birds inside a cage is that the birds tend to throw or scatter bird feed from the feeder located within the cage. The scattered bird feed creates a mess surrounding the bird cage which is unsightly, unsanitary, and difficult to clean.

It has been recognized in U.S. Pat. No. 4,838,205 to Larson that certain types of birds, particularly ground-feeding birds such as sparrows and grackles, have a tendency to throw or scatter bird feed from a tray by swinging their beaks from side to side within the tray so that a significant amount of bird feed is wasted. The feeder disclosed in the Larson patent reduces the loss of bird feed from a feeding tray of an outdoor bird feeder by providing a plurality of partitions located within the tray to restrict movement of bird feed caused by the wind blowing or by birds that scatter the bird feed out of the feeding tray. In other words, the plurality of partitions disclosed in the Larson patent provide baffles which tend to limit movement of the bird feed in the feeding tray.

U.S. Pat. No. 4,974,546 to Burgett discloses a bird feeder for use inside a bird cage. The feeder disclosed in the Burgett patent includes a housing surrounding the bird feeder prevent the bird from throwing food out of the cage. Seeds or husks thrown by the bird strike an inside wall of the housing which prevents the seeds from falling outside of the cage.

The solution to the problem of scattering bird feed disclosed in the Burgett device has several drawbacks. First, the Burgett device is more suited for smaller birds. The housing for large birds would have to be very large in order to provide the large bird with proper access to the feeder. In addition, the housing provides an additional surface which must be cleaned and tends to block an observer's view of the bird during feeding.

An object of the present invention is to provide a bird feeder for use inside a bird cage which reduces scattering of bird seed without the use of a bulky housing or other type of enclosure surrounding the feeder.

The present invention recognizes that large indoor birds located within bird cages also tend to scatter food by moving their beaks through the food located within the feeder. The present invention solves the problem of scattering bird feed from the feeder by providing means for blocking lateral movement of the bird's beak within an interior region of the feeder. Therefore, the present invention inhibits the bird from slinging the bird feed out of the interior region of the feeder.

According to one aspect of the present invention, a bird feeder is provided for use in a bird cage. The feeder includes a cup having a bottom surface and an outer wall. The outer wall includes a top edge defining an inner region for holding bird feed therein. The feeder also includes means for securing the cup to the bird cage. In addition, the feeder includes means for blocking lateral movement of a bird's beak within the inner region of the cup. The blocking means is coupled to the cup. The blocking means reduces the amount of bird feed that is thrown out of the cup by the bird.

According to another aspect of the present invention, the blocking means includes a partition coupled to the cup. The partition is located in the inner region of the cup to divide the inner region into first and second regions. In one embodiment, the partition includes a bottom surface spaced apart from the bottom surface of the cup to permit bird feed in the cup to pass beneath the partition. In another embodiment, the partition extends upwardly from the bottom surface of the cup and is formed to include at least one aperture therein to permit bird feed in the cup to pass through the at least one aperture between the first and second regions. Therefore, the depth of the bird feed in the first and second regions remains at substantially equal levels.

According to yet another aspect of the invention, the top edge of the outer wall of the cup is located substantially in a plane and the partition includes a top edge which is substantially coplanar with the top edge of the outer wall.

According to still another aspect of the invention, the cup includes a rear panel, and the outer wall defines a front wall and opposite, spaced apart side walls. The partition extends between the front wall and the rear panel of the cup. The rear panel is spaced apart from the front wall by a first distance and the opposite side walls are spaced apart by a second distance greater than the first distance.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
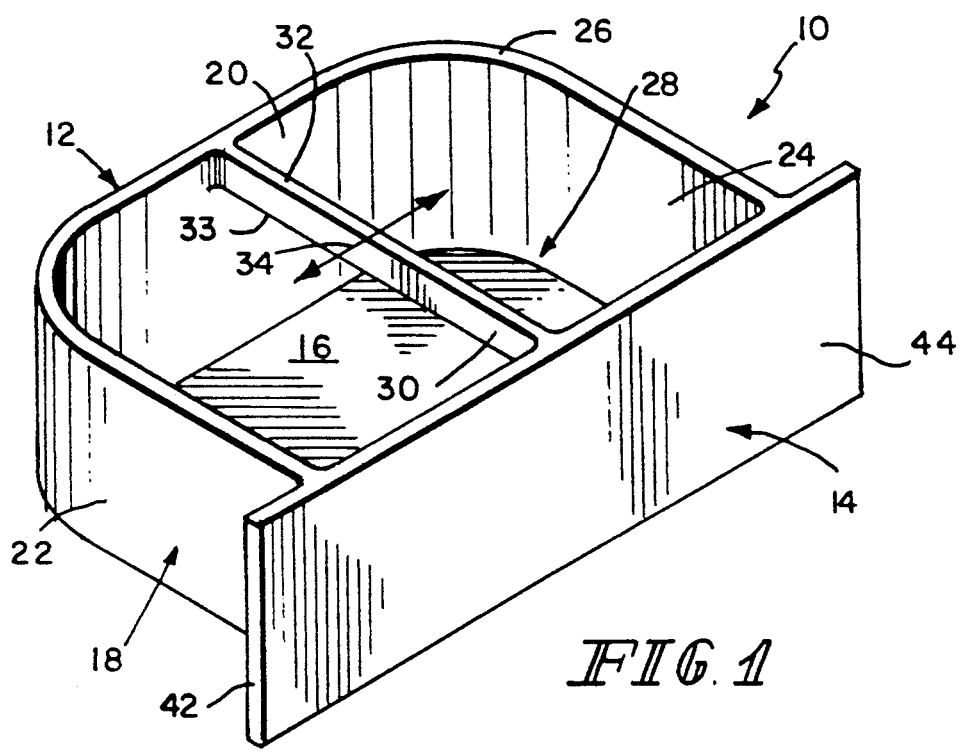
FIG. 1 is a perspective view of a first embodiment of the present invention illustrating a bird feeder designed to be attached a bird cage which includes a partition inside the feeder to prevent a bird from slinging its beak through the feeder, thereby reducing the amount of bird feed which is thrown from the feeder by a bird.

Referring now to the drawings, FIG. 1 illustrates a bird feeder 10 including a cup portion 12 for holding bird feed and a rear panel 14 for mounting the feeder 10 to a cage. Bird feeder 10 is designed to be attached to a bird cage to feed a bird within the cage. Feeder 10 includes a bottom surface 16 and a continuous outer wall 18 defining a boundary of cup 12. Outer wall 18 includes a front wall 20 and opposite side walls 22 and 24. The distance between rear panel 14 and front wall 20 is less than the distance between side walls 22 and 24. Outer wall 18 also includes a top edge 26. Top edge 26 lies substantially within a single plane and defines the access opening to an inner region 28 of feeder 10 for holding the bird feed therein.

Feeder 10 is formed to include an partition 30 which extends between front wall 20 and rear panel 14. Partition 30 includes a top edge 32 which is substantially coplanar with top edge 26 of outer wall 18.

As a bird eats food from feeder 10 within a cage 45, the bird tends to sling its beak back and forth laterally through cup 12 of feeder 10 in the directions of double-headed arrow 34. This lateral movement of the bird's beak tends to throw or scatter bird feed from a feeder.

Partition 30 is designed to block or interrupt lateral movement of the bird's beak in the directions of arrow 34 through feeder 10. Therefore, feeder 10 of the present invention reduces the amount of bird feed which is scattered from feeder 10. In the FIG. 1 embodiment, partition 30 extends only slightly below top edge 26 of outer wall 18. A bottom surface 33 or partition 30 is spaced apart from bottom surface 16 of feeder 10. Therefore, bird feed inside inner region 28 of feeder 10 can pass beneath partition 30 so that the bird feed on bottom surface 16 remains at substantially the same level.

Figure 2:
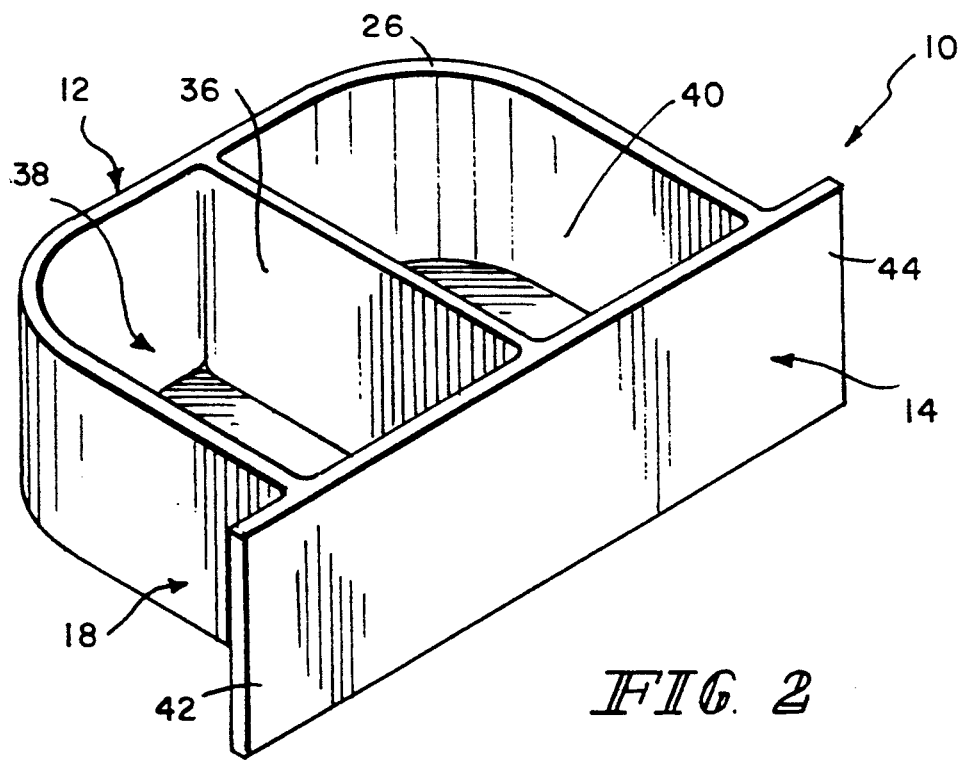
FIG. 2 is a perspective view of a second embodiment of the present invention in which the partition extends between a top edge of the feeder and the bottom surface of the feeder.

In another embodiment of the present invention illustrated in FIG. 2, a partition 36 extends from top edge 26 of outer wall 18 to bottom surface 16 to define first and second separate compartments or regions 38 and 40, respectively, within interior region 28 of feeder 10. Partition 36 also functions to block movement of the bird's beak through cup 12 of feeder 10.

Figure 3:
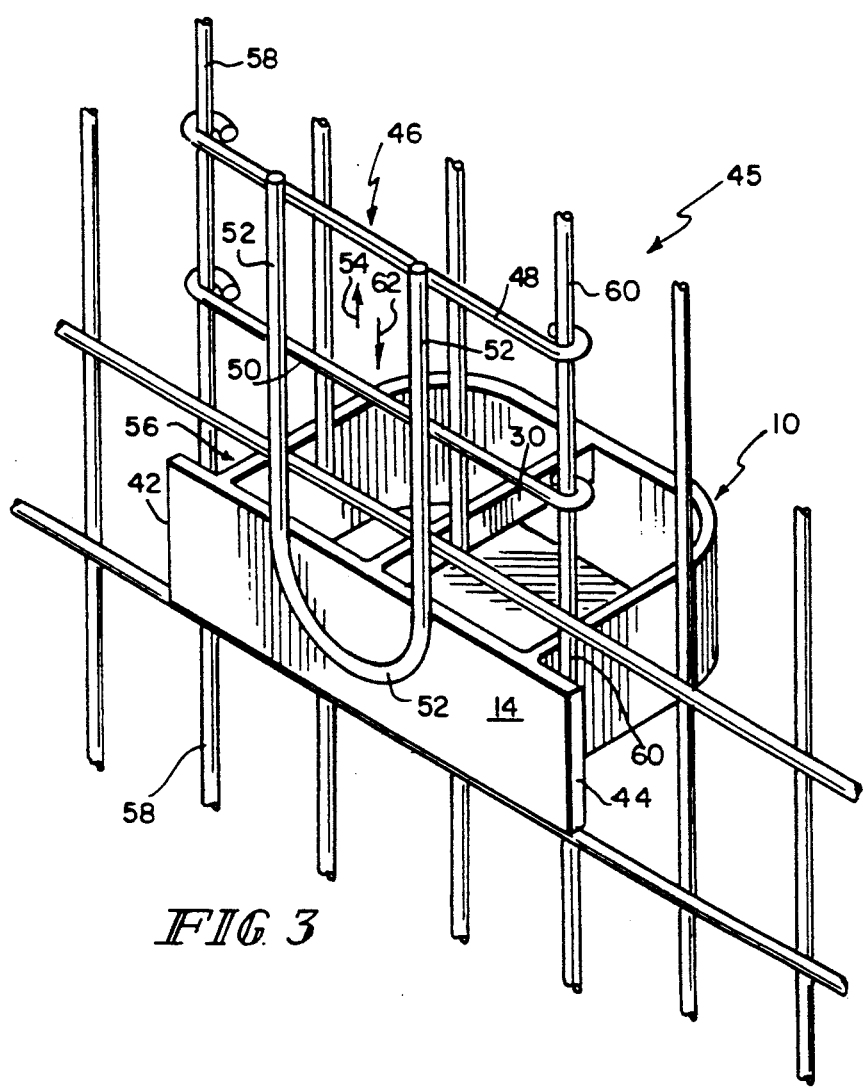
FIG. 3 is a perspective view illustrating the feeder of FIG. 1 attached to a bird cage.

FIG. 3 illustrates feeder 10 of FIG. 1 attached to a bird cage 45. Rear panel 14 extends beyond side walls 22 and 24 to define first and second flanges 42 and 44, respectively. Flanges 42 and 44 retain feeder 10 against cage 45 as illustrated in FIG. 3. A sliding door 46 includes two slide bars 48 and 50 which are slidably coupled to bars 58 and 60 of cage 45 and an elongated U-shaped portion 52 coupled to slide bars 48 and 50. Sliding door 46 is moved upwardly in direction of arrow 54 to expose an opening 56 in cage 45 for receiving feeder 10. Feeder 10 is then removed from cage 45 to be cleaned or restocked with bird feed. After the bird feed is added to feeder 10, feeder 10 is inserted through aperture 56 until flanges 42 and 44 abut bars 58 and 60 of cage 45. Sliding door 46 then is moved downwardly in the direction of arrow 62 so that U-shaped portion 52 engages rear panel 14 to hold feeder 10 against to cage 45.

After feeder 10 is installed in cage 45, a bird (not shown) within cage 45 can eat from feeder 10. However, lateral movement of the bird's beak through cup 12 in the directions of double-headed arrow 34 (FIG. 1) is prevented by partition 30. By blocking this lateral movement of the bird's beak, feeder 10 of the present invention reduces the amount of bird feed which is scattered from feeder 10. The present invention advantageously accomplishes the reduction in the amount of scattered bird feed without the use of any bulky housing or enclosure surrounding the feeder. Accordingly, the present invention provides advantages over conventional feeders which provide such enclosures for deflecting the seed thrown by the bird.

It is understood that various structures other than partitions 30 and 36 can be used to block lateral movement of the bird's beak within feeder 10. In addition, if the feeder is wide enough, a plurality of substantially parallel partitions may be used to limit lateral movement of the bird's beak within a wide feeder.

Figure 4:
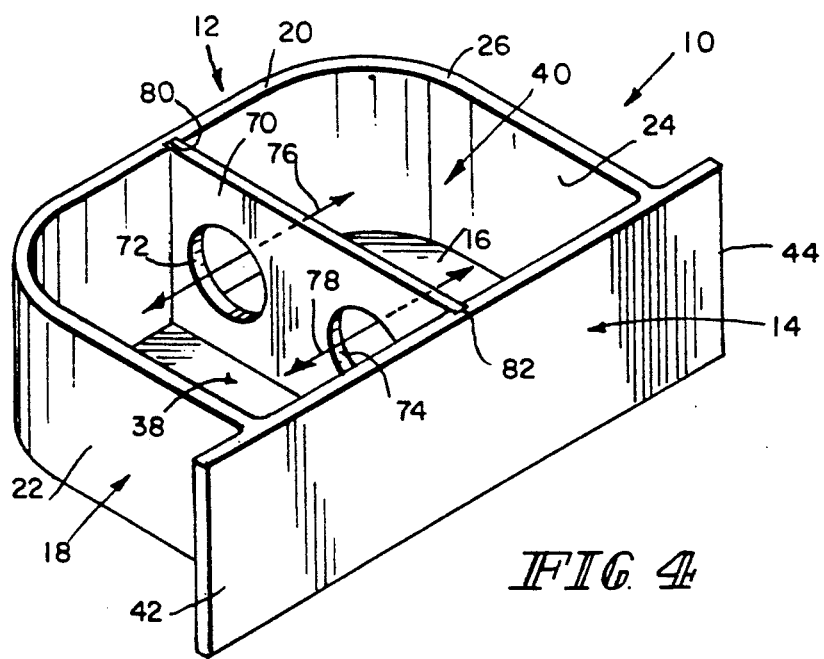
FIG. 4 is a perspective view of a third embodiment of the present invention in which the partition is formed to include a pair of apertures therein which permit bird feed in the cup to pass through the partition between first and second regions of the cup.

FIG. 4 illustrates another embodiment of the present invention. Those portions of FIG. 4 referenced by numbers identical to numbers in FIGS. 1–3 provide the same or similar function. In the FIG. 4 embodiment, a partition 70 extends between front wall 20 and rear panel 14 of cup 12 to divide interior region 28 of cup 12 into first and second compartments or regions 38 and 40, respectively. Partition 70 is designed to block movement of a bird's beak as discussed above with reference to FIGS. 1 and 2 to reduce the amount of bird feed scattered by the bird from feeder 10.

Partition 70 is formed to include first and second apertures 72 and 74 therein. Apertures 72 and 74 permit movement of bird feed between first and second regions 38 and 40 through partition 70 as illustrated by arrows 76 and 78, respectively. This movement of the bird feed through aperture 72 and 74 advantageously maintains the depth of the bird feed substantially equal in both the first and second regions 38 and 40 of cup 12. At least one aperture 72 or 74 is formed in partition 70. It is understood that more than two apertures may be formed in partition 70. Partition 70 is formed as a separate piece from cup 12 and then inserted into grooves 80 and 82 formed in front wall 20 and rear panel 14, respectively, of feeder 10. Partition 70 is then glued to cup 12.

Although the invention has been described in detail with reference to certain preferred embodiments, variations and modifications exist within the scope and spirit of the invention as described and defined in the following claims.

What is claimed is:

1. A bird feeder for use in a bird cage, the feeder comprising:
 a cup including a bottom surface and an outer wall having a top edge defining an inner region for holding bird feed therein;
 means for securing the cup to the bird cage; and
 means for blocking lateral movement of a bird's beak within the inner region of the cup, thereby reducing the amount of bird feed that is thrown out of the cup by bird, the blocking means including a partition located in the inner region of the cup and extending upwardly from the bottom surface to divide the inner region into first and second regions, the partition being formed to include at least one aperture therein at a lower portion adjacent the bottom surface to permit bird feed in the cup to pass through the partition between the first and second regions.

2. The bird feeder of claim 1, wherein the top edge of the outer wall of the cup is located substantially in a plane and the partition includes a top edge which is substantially coplanar with the top edge of the outer wall.

3. The bird feeder of claim 1, wherein the cup includes a rear panel, and the outer wall defines a front wall and opposite, spaced apart side walls, the partition extending between the front wall and the rear panel of the cup.

4. The bird feeder of claim 3, wherein the rear panel is spaced apart from the front wall by a first distance and the opposite side walls are spaced apart by a second distance greater than the first distance.

5. The bird feeder of claim 1, wherein the means for securing the cup to the cage includes a pair of flanges formed on the cup for abutting the cage to secure the cup to the cage.

6. The bird feeder of claim 1, wherein the cup includes a rear panel, and the outer wall defines a front wall and opposite, spaced apart side walls, the front wall being formed to includes a first groove therein for receiving a first end edge of the partition and the rear panel being formed to include a second groove therein for receiving a second end edge of the partition to couple the partition to the cup.

7. The bird feeder of claim 6, wherein the partition is formed to include first aperture adjacent the front wall and a second aperture adjacent the rear panel.

8. In a bird feeder including a cup having a bottom surface and an outer wall defining an inner region for holding bird feed therein, the improvement comprising:
a partition formed in the inner region of the cup for blocking lateral movement of a bird's beak within the inner region of the cup to reduce the amount of bird feed thrown out of the cup by the bird, the partition being configured to extend upwardly from the bottom surface of the cup to divide the inner region of the cup into first and second regions, and the partition being formed to include at least one aperture therein at a lower portion adjacent the bottom surface to permit bird feed in the cup to pass through the partition between the first and second regions.

9. The bird feeder of claim 8, wherein the outer wall of the cup includes a top edge located substantially in a plane and the partition includes a top edge which is substantially coplanar with the top edge of the outer wall.

10. The bird feeder of claim 8, wherein the cup includes a rear panel, and the outer wall defines a front wall and opposite, spaced apart side walls, the partition extending between the front wall and the rear panel of the cup.

11. The bird feeder of claim 10, wherein the rear panel is spaced apart from the front wall by a first distance and the opposite side walls are spaced apart by a second distance greater than the first distance.

12. The bird feeder of claim 8, wherein the cup includes a rear panel, and the outer wall defines a front wall and opposite, spaced apart side walls, the front wall being formed to includes a first groove therein for receiving a first end edge of the partition and the rear panel being formed to include a second groove therein for receiving a second end edge of the partition to couple the partition to the cup.

13. The bird feeder of claim 12, wherein the partition is formed to include first aperture adjacent the front wall and a second aperture adjacent the rear panel.

14. A bird feeder for attachment to a bird cage, the bird feeder comprising:
a cup including a bottom surface and an outer wall extending upwardly from the bottom surface to define an inner region for holding bird feed;
means for securing the cup to the bird cage; and
a partition coupled to the outer wall of the cup and located in the inner region for blocking lateral movement of a bird's beak in the inner region to reduce the amount of bird feed thrown out of the feeder by a bird slinging its beak laterally through the inner region, the partition dividing the inner region of the cup into first and second regions, the partition being formed to include at least one aperture therein at a lower portion adjacent the bottom surface to permit bird feed in the cup to pass through the partition between the first and second regions.

15. The bird feeder of claim 14, wherein the outer wall of the cup includes a front wall, first and second side walls, and a rear wall, the rear wall being spaced apart from the front wall be a first distance and the opposite side walls are spaced apart by a second distance greater than the first distance.

16. The bird feeder of claim 14, wherein the outer wall of the cup includes a top edge located substantially in a plane and the partition includes a top edge which is substantially coplanar with the top edge of the outer wall.

17. The bird feeder of claim 14, wherein the means for securing the cup to the cage includes a pair of flanges formed on the cup for abutting the cage to secure the cup to the cage.

18. The bird feeder of claim 14, wherein the cup includes a rear panel, and the outer wall defines a front wall and opposite, spaced apart side walls, the front wall being formed to includes a first groove therein for receiving a first end edge of the partition and the rear panel being formed to include a second groove therein for receiving a second end edge of the partition to couple the partition to the cup.

19. The bird feeder of claim 18, wherein the partition is formed to include first aperture adjacent the front wall and a second aperture adjacent the rear panel.

* * * * *